United States Patent
Englmaier (10) Patent No.: US 11,358,088 B1
(45) Date of Patent: Jun. 14, 2022

(54) FILTER ASSEMBLY FOR AN AIR FILTER

(71) Applicant: MANN+HUMMEL GmbH, Ludwigsburg (DE)

(72) Inventor: Michael Englmaier, Portage, MI (US)

(73) Assignee: MANN+HUMMEL GmbH, Ludwigsburg (DE)

(*) Notice: Subject to any disclaimer, the term of this patent is extended or adjusted under 35 U.S.C. 154(b) by 0 days.

(21) Appl. No.: 17/237,163

(22) Filed: Apr. 22, 2021

(51) Int. Cl.
*B01D 46/24* (2006.01)
*B01D 46/00* (2022.01)

(52) U.S. Cl.
CPC ...... *B01D 46/2411* (2013.01); *B01D 46/0005* (2013.01)

(58) Field of Classification Search
CPC .......... B01D 2201/34; B01D 2201/347; B01D 46/2411; B01D 46/0005; B01D 2201/30; B01D 2201/304; B01D 2201/305; B01D 2201/306; B01D 2201/307; B01D 2271/00; B01D 2271/02; B01D 2271/022
See application file for complete search history.

(56) References Cited

U.S. PATENT DOCUMENTS

| | | | |
|---|---|---|---|
| 10,337,471 B2 | 7/2019 | Kaufmann | |
| 10,865,749 B2 | 12/2020 | Kaufmann | |
| 10,961,957 B2 | 3/2021 | Kaufmann | |
| 2002/0020156 A1* | 2/2002 | Goerg | F02M 35/024 55/497 |
| 2013/0239531 A1* | 9/2013 | Koda | B01D 46/10 55/502 |
| 2015/0013288 A1 | 1/2015 | Hasenfratz et al. | |
| 2015/0020489 A1* | 1/2015 | Sudermann | B29C 39/10 55/502 |
| 2016/0040633 A1* | 2/2016 | Schmid | F02M 35/02491 55/502 |
| 2016/0108866 A1 | 4/2016 | Dewit | |
| 2017/0096971 A1* | 4/2017 | Kaufmann | B01D 50/20 |
| 2017/0304760 A1* | 10/2017 | Kaufmann | B01D 46/0013 |
| 2018/0339254 A1* | 11/2018 | Kaufmann | B01D 46/521 |
| 2018/0363598 A1* | 12/2018 | Ruhland | B01D 46/0005 |
| 2020/0072169 A1* | 3/2020 | Ehrenberg | B01D 46/0009 |

FOREIGN PATENT DOCUMENTS

EP 2106836 A1 3/2008

* cited by examiner

*Primary Examiner* — Hung Q Nguyen (57) ABSTRACT

A filter assembly for an air filter includes a filter element and a sealing member. The filter element has a filter medium and includes an inflow side, an outflow side, and a filter axis extending therethrough from the inflow side to the outflow side. The sealing member surrounds a peripheral edge of the inflow side of the filter element. The sealing member includes an edge protecting portion and a sealing portion. The edge protecting portion includes a side portion extending in a first direction from the peripheral edge of the inflow side along a portion of a side of the filter element. The sealing portion depends from the edge protecting portion and extends axially farther than the side portion of the edge protecting portion in a second direction perpendicular to the first direction. The sealing portion is adapted to engage a housing of the air filter.

25 Claims, 12 Drawing Sheets

FILTER ASSEMBLY FOR AN AIR FILTER

FIELD

The present disclosure relates to air induction systems. More particularly, the present disclosure relates to a filter assembly for an air induction system of a motor vehicle.

BACKGROUND

This section provides background information related to the present disclosure which is not necessarily prior art.

Air induction systems are used in motor vehicles and for other applications to transport air from the environment to an engine for combustion. An air induction system conventionally includes an air filter to deliver air to the engine that is substantially free of debris. An example of such an air filter is shown and described in commonly assigned US Publication No. 2018-0339254 which is hereby incorporated by reference as if fully set forth herein.

The air filter of US Publication No. 2018-0339254 has a filter housing with an inlet opening for receiving air to be cleaned and outlet opening for expelling cleaned air. A filter element is arranged in an element receptacle of the filter housing which separates the inlet opening from the outlet opening. The filter housing has an installation opening through which the filter element in an installation direction is introduced into the element receptacle. The filter housing has a housing cover for closing the installation opening. The installation opening is arranged on a transverse side of the housing that is lateral relative to a housing axis. The filter housing has a sealing surface surrounding the housing axis at least partially circumferentially, for contacting a seal of the filter element. The filter element has a seal support device for the seal and the filter housing has a pressing device for the seal support device.

While known air filters for air induction systems, including but not limited to the air filter described in US Publication No. 2018-0339254, may have proven to be acceptable for their intended uses, continuous improvement in the pertinent art is desired.

SUMMARY

This section provides a general summary of the disclosure, and is not a comprehensive disclosure of its full scope or all of its features.

It is a general object of the present teachings to provide filter assembly for an air filter that substantially prevents debris from bypassing a filter element of the filter assembly.

According to one particular aspect, the present disclosure provides a filter assembly for an air filter. The filter assembly includes a filter element and a sealing member. The filter element has a filter medium and includes an inflow side, an outflow side, and a filter axis extending therethrough from the inflow side to the outflow side. The sealing member surrounds a peripheral edge of the inflow side of the filter element. The sealing member includes an edge protecting portion and a sealing portion. The edge protecting portion includes a side portion extending in a first direction from the peripheral edge of the inflow side along a portion of a side of the filter element. The sealing portion depends from the edge protecting portion and extends axially farther than the side portion of the edge protecting portion in a second direction perpendicular to the first direction. The sealing portion is adapted to engage a housing of the air filter.

According to another particular aspect, the present disclosure provides an air filter. The air filter has a housing, a housing cover, a filter element, and a sealing member. The housing includes an installation opening, at least one inlet opening for air to be cleaned, and at least one outlet opening for cleaned air. The housing contains an element receptacle configured to be received through the installation opening. The housing cover is configured to selectively close the installation opening. The filter element is disposed in the housing and includes an inflow side, an outflow side, and a filter axis extending therethrough from the inflow side to the outflow side. The filter element separates the at least one inlet opening from the at least one outlet opening. The sealing member surrounds a peripheral edge of the inflow side of the filter element. The sealing member includes an edge protecting portion and a sealing portion. The edge protecting portion includes a side portion extending in a first direction from the peripheral edge of the inflow side along a portion of a side of the filter element. The sealing portion depends from the edge protecting portion and extends axially farther than the side portion of the edge protecting portion in a second direction perpendicular to the first direction. The sealing member, when compressed against the housing, seals against the housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

With general reference to FIGS. 1-14 the drawings, a filter assembly in accordance with the present teachings is illustrated and generally identified at reference numeral 10. The filter assembly 10 is shown throughout many of the drawings incorporated into an air filter 12. The air filter 12 may be used to filter induction air delivered to a combustion engine of a motor vehicle, for example. As will become clear below, the filter assembly 10 of the present teachings cooperates with a filter housing 14 of the air filter 12 to further reduce the opportunity for debris to enter combustion air delivered to the engine. Prior to addressing the construction and operation of the filter assembly 10, including cooperation of the filter assembly 10 with the filter housing 14 of the air filter 12, an understanding of the exemplary use environment shown in the drawings is warranted.

To aid in understanding, some of the figures depict an imaginary main filter axis 16, an imaginary vertical filter axis 18, and an imaginary transverse filter axis 20. The axes 16, 18, 20 correspond in an exemplary manner to a right-angle coordinate system. For simplifying the drawings, the reference character 16 can relate to the main filter axis of the filter assembly 10 or the main filter axis of the air filter 12, depending on the illustration. In this context, it is understood that the corresponding axis is referred to in the respective figures. Likewise, this relationship holds true for the axes 18 and 20. It will be further understood that some of the imaginary, illustrative axes and any arrows along the axes may be oriented at a slant to each other within the scope of the present teachings.

In the embodiment generally shown in the figures, the transverse sides of the air filter 12, including more specifically the filter housing 14 and filter assembly 10, extend on opposite sides of a transverse plane defined by the horizontal filter axis 20 and main filter axis 16. Likewise, the longitudinal sides of the air filter 12, including more specifically the filter housing 14 and filter assembly 10, extend on opposite sides of a vertical plane defined by the vertical filter axis 18 and main filter axis 16.

In the embodiment generally shown, the longitudinal sides of the filter housing 14 are closed longitudinal walls 22. It is noted that in FIGS. 2 and 5-8, the respective forward longitudinal wall 22 of the filter housing 14 is at least partially cut away in order to enable a view of the interior of the filter housing 14. A closed transverse wall 24 generally forms the bottom of the filter housing 14.

The air filter 12 is shown to generally include a filter housing 14. The filter housing 14 is generally shown to include a housing body 26 and a housing cover 28. Both the housing body 26 and the housing cover 28 may be manufactured of plastic, such as an injection molded plastic, or another suitable material. The housing body 26 has an element receptacle 30.

Figure 1:
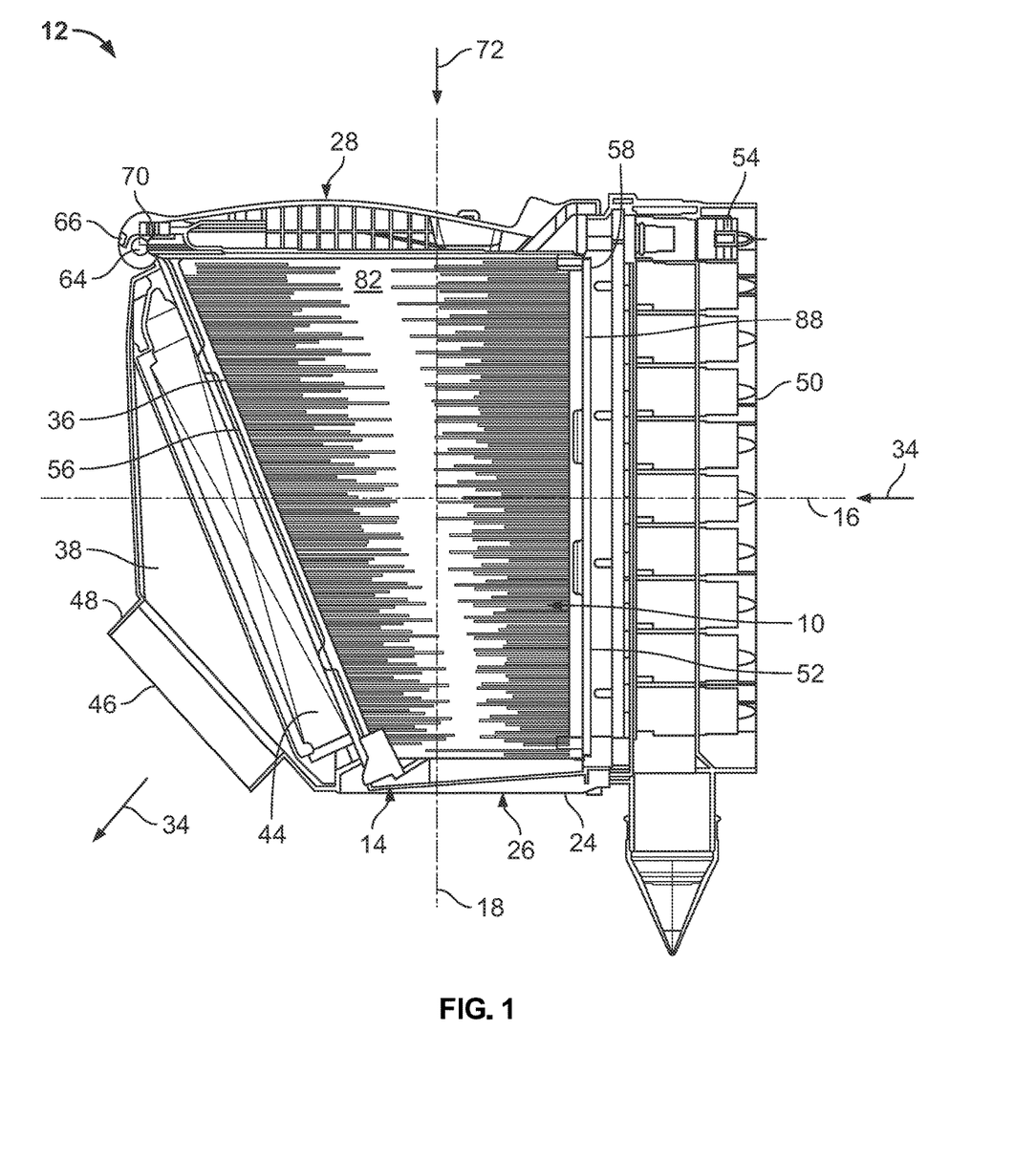
FIG. 1 is cross-sectional view illustrating a filter assembly in accordance with the present teachings, the filter assembly shown operatively incorporated into an air filter for delivering combustion air to an engine of motor vehicle.
Figure 2:
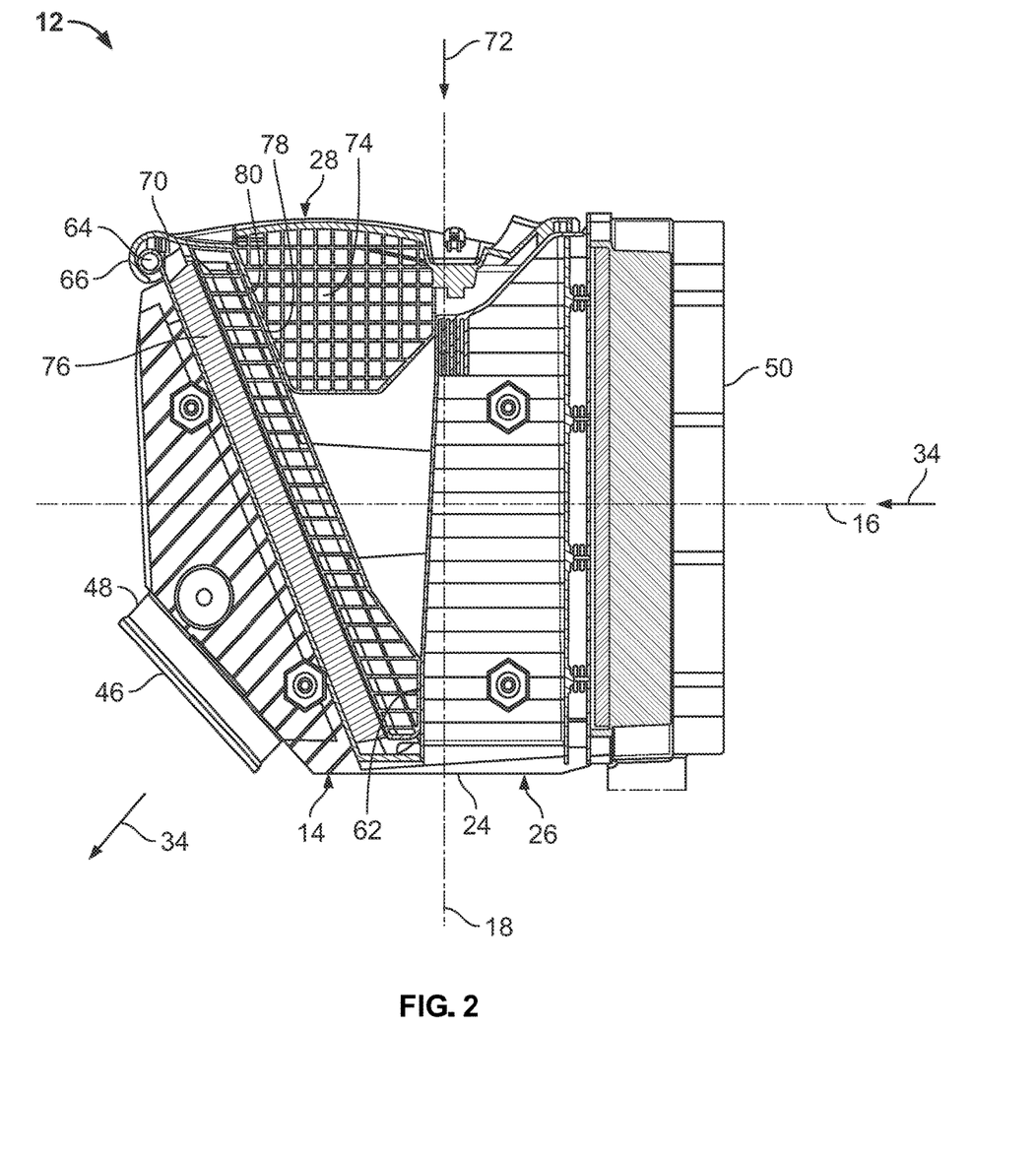
FIG. 2 is another cross-sectional view of the air filter of FIG. 1, in which a righthand portion of the air filter is partially sectioned.
Figure 3:
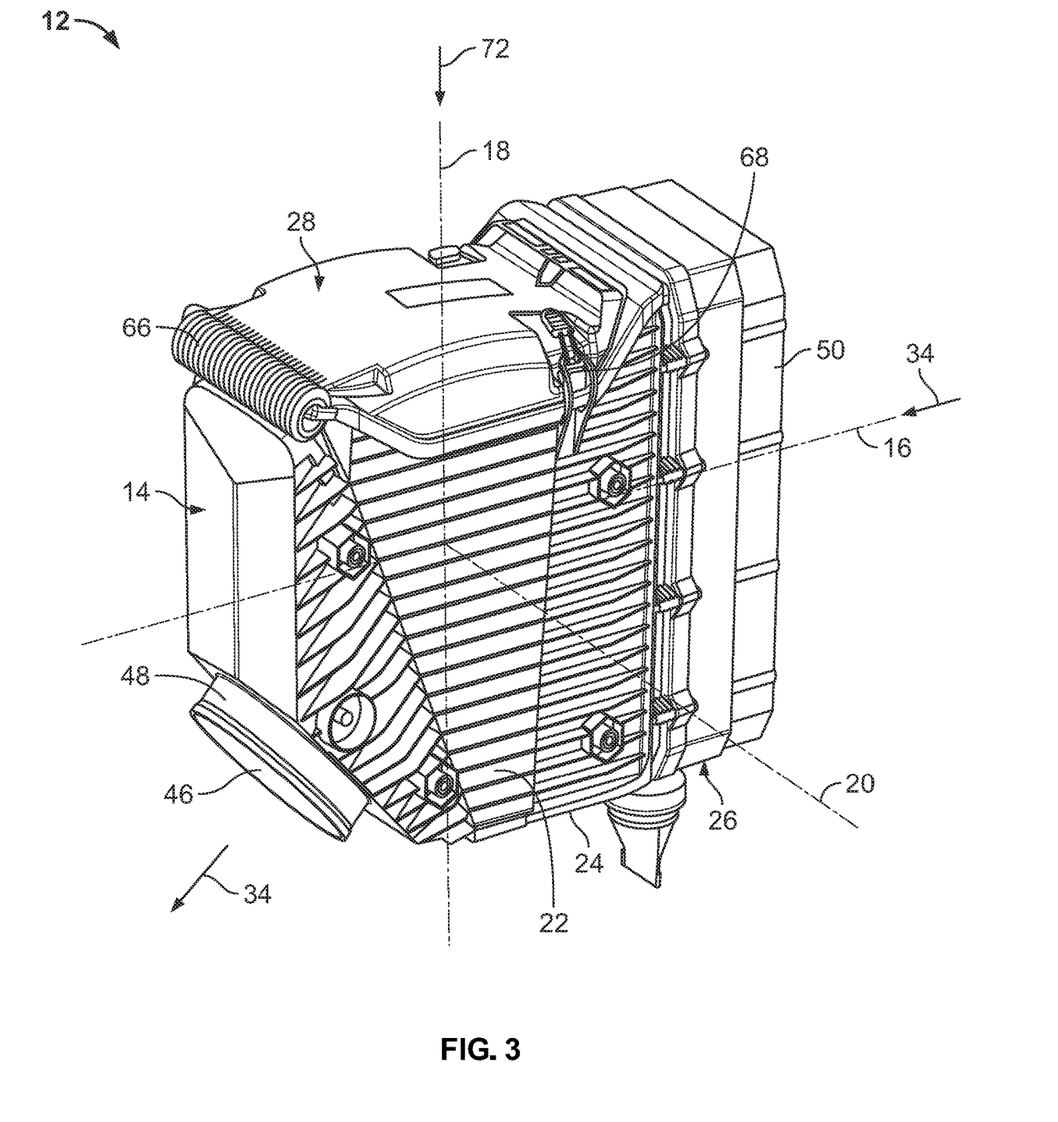
FIG. 3 is a perspective view of the air filter of FIG. 1 and FIG. 2, the air filter shown in an assembled configuration.

The housing body 26 is configured such that the filter assembly 10 can be placed or installed within the element receptacle 30. The housing cover 28 covers an installation opening 32 defined by the top of the element receptacle 30 and thereby creates a closed housing position for the air filter 12, in which the housing cover 28 is generally illustrated as the top of the air filter 12. FIGS. 1-3 show the air filter 12 in such a closed housing position with the filter assembly 10 in the element receptacle 30.

In FIGS. 1-3, 10, and 11 the generalized airflow direction through the air filter 12 is illustrated by the arrows 34. Air inflow is illustrated to start in a direction generally parallel to the main filter axis 16. Air outflow is generally illustrated to exit the air filter 12 at a slant to the air inflow as the arrows 34 further depict. Continuing with particular reference to FIGS. 1-3, an air outlet 36 on the downstream side of the element receptacle 30 allows cleaned air to enter an air outlet space 38. The filter assembly 10 is generally shown to include a filter element 40 and an element frame 42. The filter element 40 may be considered a primary filter element for cleaning air. The filter assembly 10 will be described further in detail below. In addition to the filter element 40, a secondary filter element 44 may be provided for further cleaning of the air. The secondary filter element 44 may be optionally installed in the air outlet space 38. As shown, the secondary filter element 44 may cover the entire outlet aperture 46 of the filter housing 14.

Moving downstream of the air outlet space 38, an outlet socket 48 defines the outlet aperture 46 to direct cleaned air in a desirable direction, the direction generally depicted in the figures as a slant to an inlet aperture 50. This direction can be modified in respective embodiments such as for fitting the needs of a specific engine's intake manifold, for example.

Upstream, the element receptacle 30 of the housing body 26 defines an air inlet 52 that allows air to enter the filter assembly 10. Further upstream of the air inlet 52, a cyclone arrangement 54 acts as a pre-separator for particles from the uncleaned air. A different pre-separator may be used in other embodiments within the scope of the present teachings.

In the exemplary embodiment shown in FIGS. 1-4, the element receptacle 30, the air inlet 52, and the air outlet 36 each have a rectangular cross-section when viewed in the direction of the main filter axis 16. Each of these cross sections could be modified to fit the needs of alternative embodiments within the scope of the present teachings. For example, the cross sections may be circular or ovular.

The housing body 26 has a rearward housing-associated sealing surface 56. The sealing surface borders the air outlet 36 of the element receptacle 30 and generally faces in a direction towards the air inlet 52. The rearward housing-associated sealing surface 56 may be a projection from the interior surface of the closed longitudinal walls 22 inward along the horizontal filter axis 20 to border the air outlet 36. As particularly illustrated in FIG. 1, the rearward housing-associated sealing surface 56 may be at a slant to the main filter axis 16.

Figure 4:
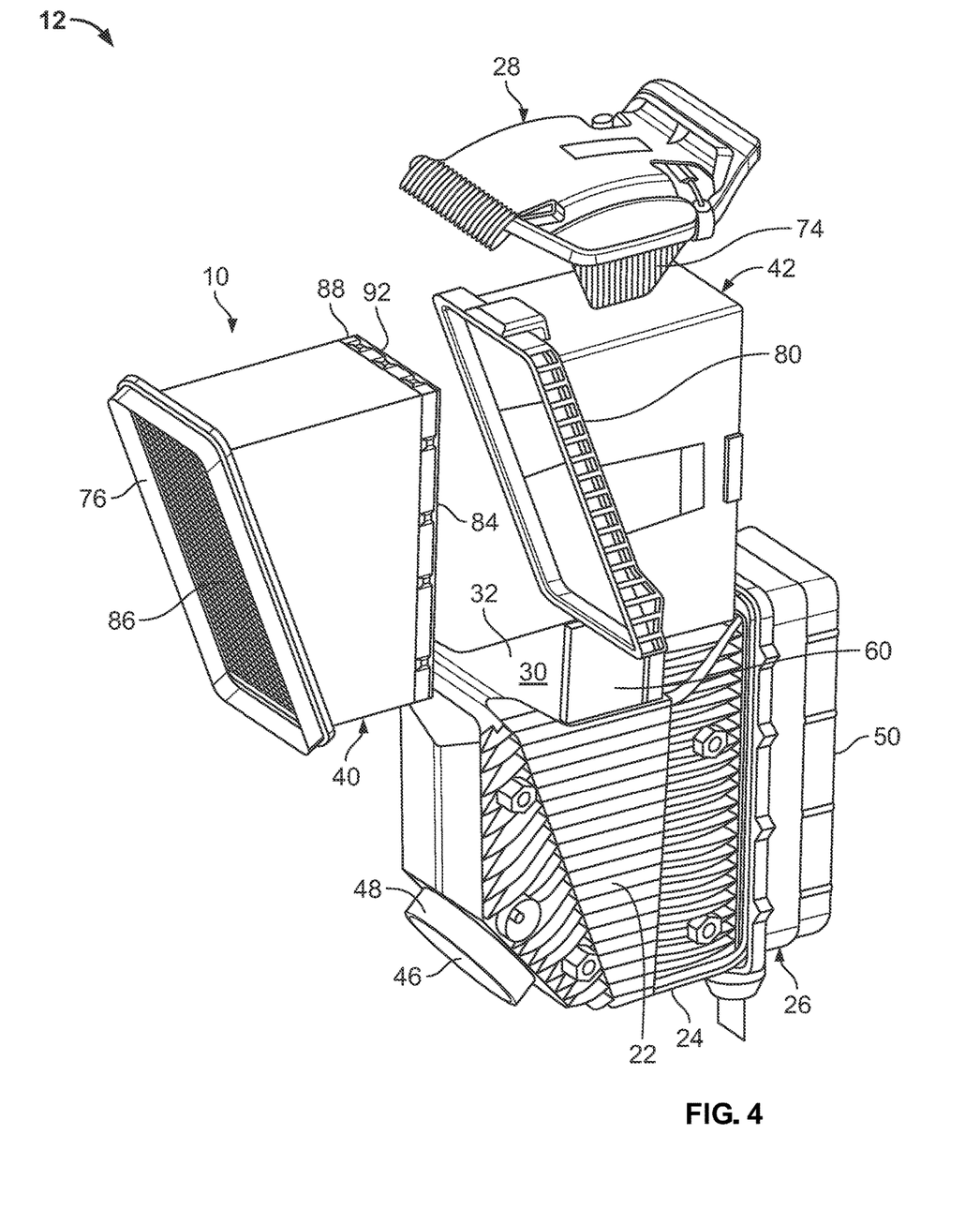
FIG. 4 is an exploded perspective view of the air filter as in FIG. 3.
Figure 14:
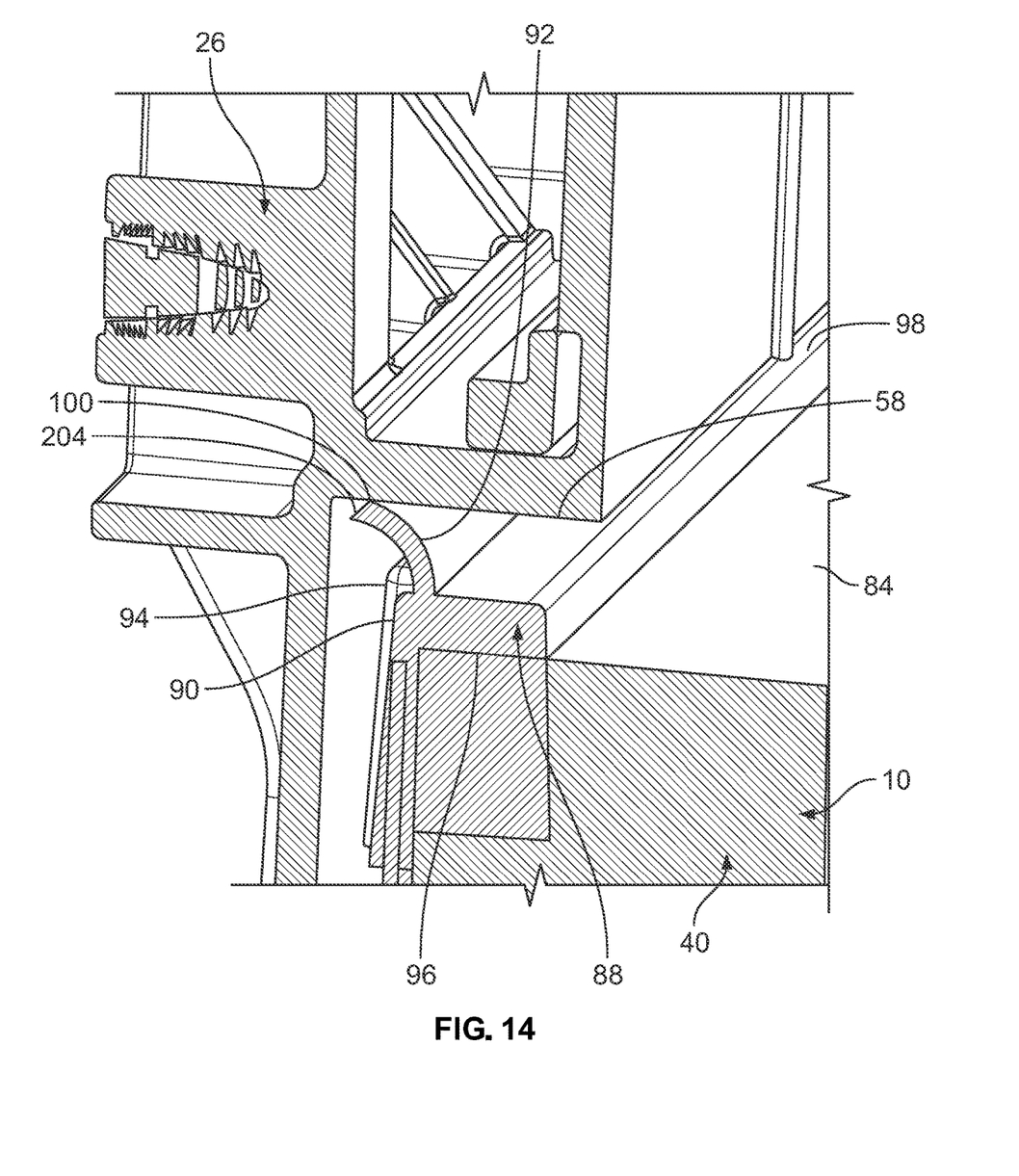
FIG. 14 is a cross-sectional view further illustrating an inlet sealing member of the filter assembly of the present teachings, the filter sealing member shown sealing onto the filter housing.
Figure 15:
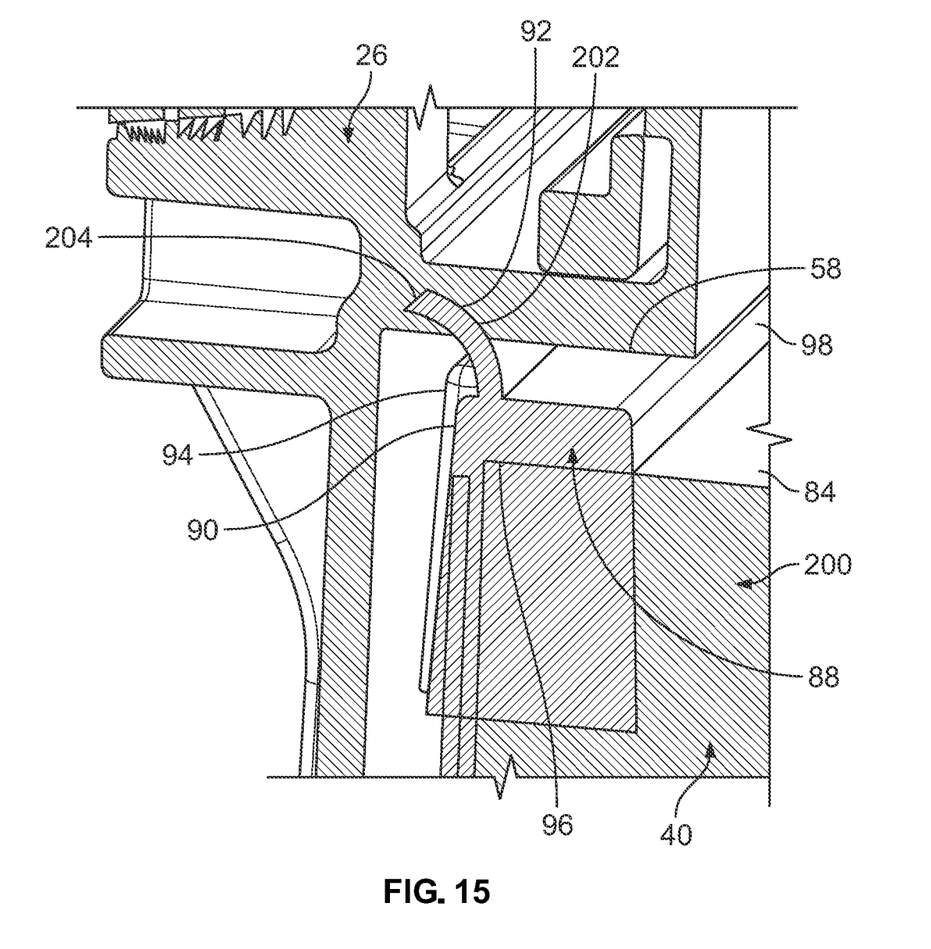
FIG. 15 is another cross-sectional view further illustrating the inlet sealing member of the filter assembly of FIG. 14, the filter sealing member shown in a state of compression while sealing onto the filter housing.

Additionally, the housing body 26 has a forward housing-associated sealing surface 58 depicted in FIG. 4 and further in FIGS. 14-15. The forward housing-associated sealing surface 58 borders the air inlet 52 of the element receptacle 30 and generally faces in a direction towards the air outlet 36. The forward housing-associated sealing surface 58 may be a projection from the interior surface of the closed longitudinal walls 22 inward along the horizontal filter axis 20 to border the air inlet 52, such that the forward housing associated sealing surface 58 is parallel or near parallel with the vertical filter axis 18.

Further describing the housing body 26, two pressing devices 60 are part of the housing body 26. The pressing devices 60 are located relative to the horizontal filter axis 20 on opposite sides of the longitudinal walls 22 and extend inward towards the element receptacle 30. The pressing devices 60 are symmetric about the longitudinal plane defined by the vertical filter axis 18 and main filter axis 16, and each have a pressing surface 62 which faces the rearward housing-associated sealing surface 56. As particularly illustrated in FIG. 2, the pressing surfaces 62 press upon the element frame 42 of the filter assembly 10 when the air filter 12 is in an assembled configuration.

Moving to the exterior of the filter housing 14, a bolt-section 64 of a hinge-type pivot connection 66 is arranged adjacent the installation opening 32. The hinge-type pivot connection 66 enables the housing cover 28, to securely connect with the housing body 26, but alternative connection devices could be employed in other embodiments to accomplish a similar connection within the scope of the present teachings. As particularly illustrated in FIG. 3, the housing cover 28 forms a transverse side of the housing body 26 when in a closed position and is secured in a closed position by clamping fasteners 68. Alternative fastening devices may be utilized within the scope of the present teachings.

As illustrated in FIGS. 1 and 2, a fall-out protection device 70 for the filter assembly 10 is located adjacent the bolt section 64. The fall-out protection device 70 may be realized as a stay which projects into the installation opening 32. The fall-out protection device 70 extends approximately parallel to the horizontal center plane across the entire width of the installation opening 32 in the direction of the horizontal filter axis 20. The fall-out protection device 70 allows for the filter assembly 10 to be more easily installed when the installation direction 72 is not parallel to the direction of gravity, e.g. when the air filter 12 and its corresponding vertical filter axis 18 are rotated generally one-hundred and eighty degrees in a transverse plane defined by the vertical filter axis 18 and horizontal filter axis 20 to an upside down orientation. In another embodiment, the air filter 12 could be orientated for side-loading of the filter assembly 10 in which case the air filter 12 and its corresponding vertical filter axis 18 would be rotated generally ninety degrees in the transverse plane defined by the vertical filter axis 18 and horizontal filter axis 20.

Figure 5:
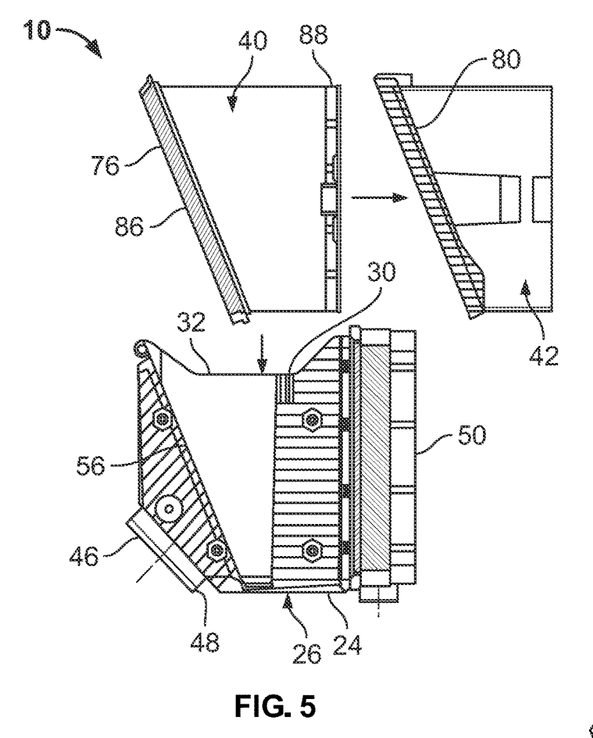
FIG. 5 is a side view illustrating a first installation phase of the filter assembly of the present teachings.
Figure 6:
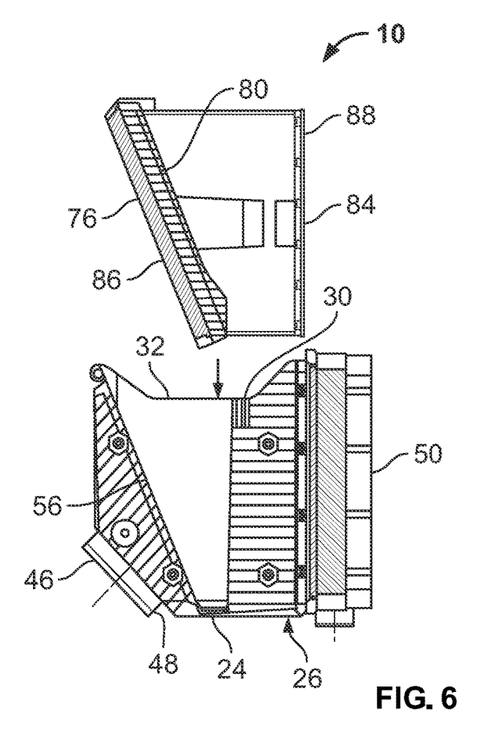
FIG. 6 is a side view illustrating a second installation phase of the filter assembly of the present teachings.
Figure 7:
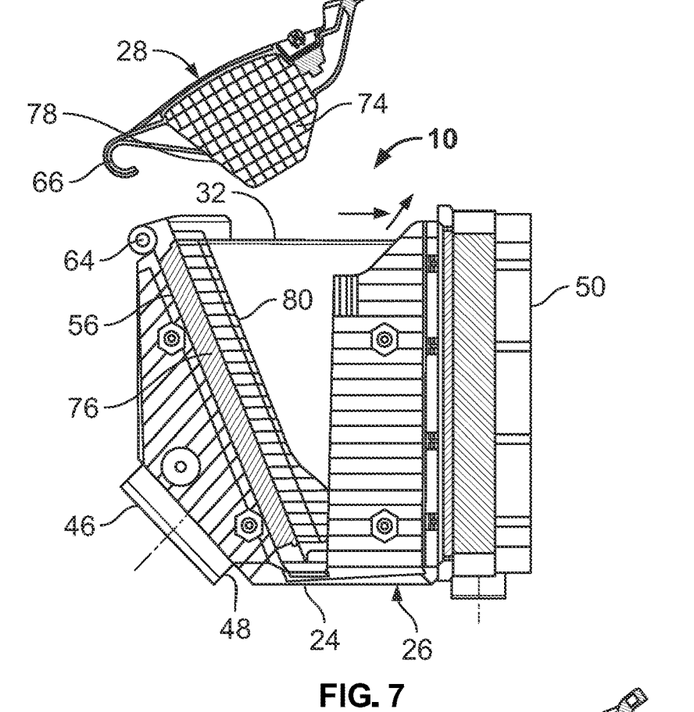
FIG. 7 is a side view illustrating a third installation phase of the filter assembly of the present teachings.
Figure 8:
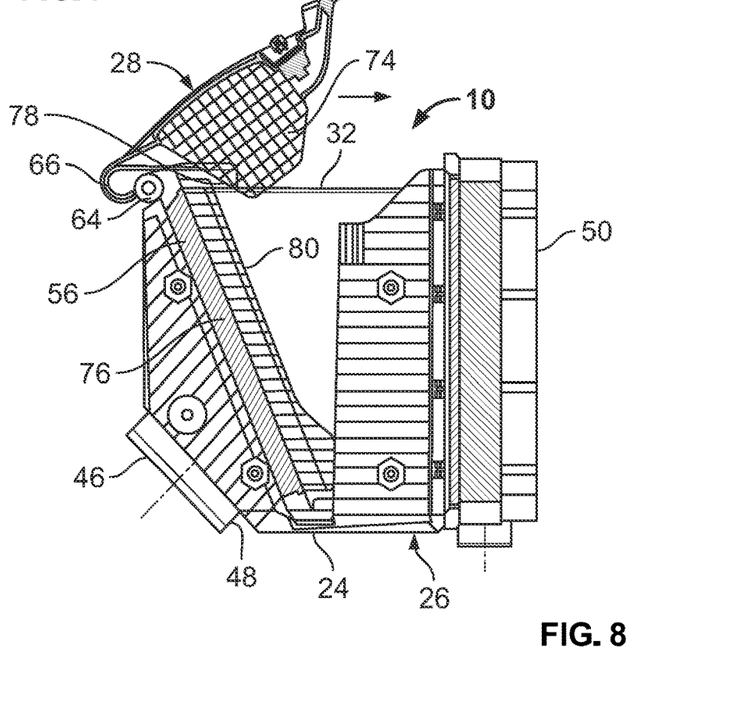
FIG. 8 is a side view illustrating a fourth installation phase of the filter assembly of the present teachings.
Figure 9:
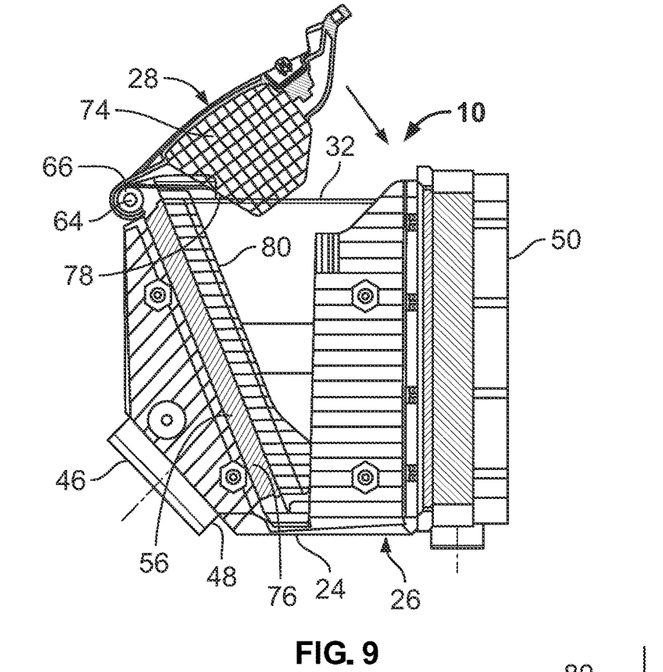
FIG. 9 is a side view illustrating a fifth installation phase of the filter assembly of the present teachings.

FIGS. 5-9 generally illustrate the construction of the air filter 12, including the loading of the filter assembly 10. As illustrated in FIG. 5, a filter element 40 and element frame 42 are combined to form the filter assembly 10 which may be done in a manufacturing phase. FIG. 6 illustrates the filter assembly 10 positioned above the housing body 26 and ready for loading into the element receptacle 30 along an installation direction 72. FIG. 7 illustrates the housing cover 28 being placed upon the hinge-type pivot connection 66. In FIG. 8, the housing cover 28 is illustrated as being attached to the bolt section 64 of the hinge-type pivot connection 66 by being pushed along the direction of the main filter axis 16, generally opposite to the airflow direction 34. FIG. 9 illustrates the housing cover 28 pivoting about the bolt section 64 towards the element receptacle 30 and the installed filter assembly 10.

Additionally detailing the interaction between the housing cover 28 and the installed filter assembly 10, the housing cover 28 has two pressure blades 74 for transmitting pressure to the outlet seal 76 (or main seal, or outlet side seal) of the filter element 40 against the rearward housing-associated sealing surface 56. The pressure blades 74 are identical, arranged mirror-symmetrical to the main filter axis 16, generally parallel to the vertical filter axis 18, and generally extend in the direction of the installation direction 72. In the installed configuration of the air filter 12, the pressing blades 74 extend through the installation opening 32 into the element receptacle 30. Thus, the pressing blades 74 are positioned along the horizontal filter axis 20 between the exterior of the filter assembly 10 and the longitudinal walls 22 of the housing body 26. Further, the pressing blades 74 are positioned along the main filter axis 16 between the pressing devices 60 and the rearward housing-associated sealing surface 56. The pressing blades 74 each have a seal-facing cover-associated pressing surface 78 which faces the outlet seal 76. In a configured assembly such as particularly illustrated in FIG. 3, the seal-facing cover-associated pressing surfaces 78 press upon a cover-blade facing pressing surface 80 of the element frame 42 as part of the filter assembly 10. The element frame 42 may extend along the lateral sides of the filter element 40 from the outlet seal 76 towards or fully up to the inlet sealing member 88. For example, in some embodiments, the element frame 42 may terminate at the pressing surface 80 and not extend to the inlet sealing member 88.

Figure 10:
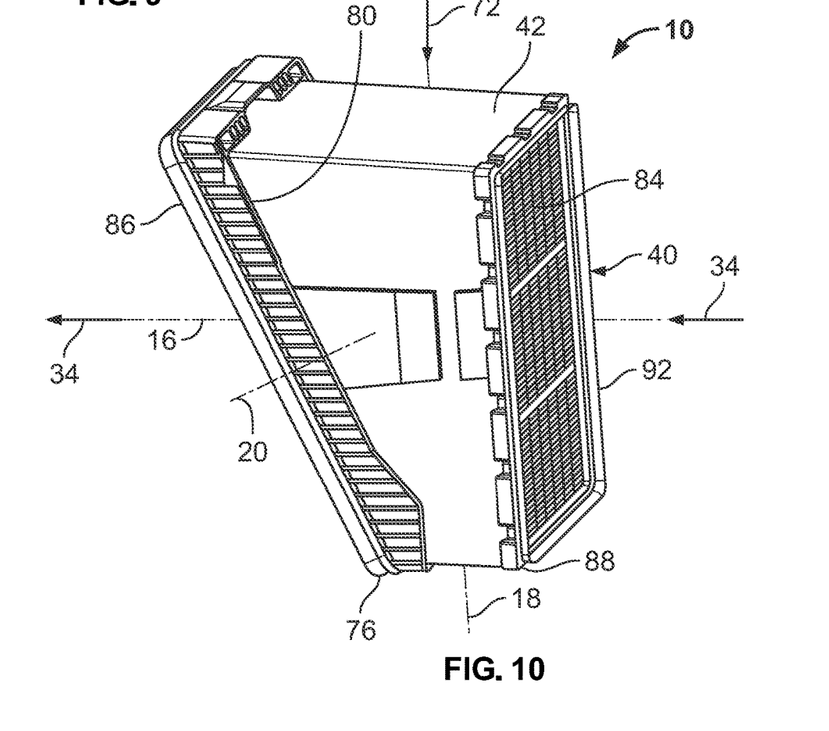
FIG. 10 is another perspective view of the filter assembly of the present teachings further illustrating an inflow side of the filter assembly.
Figure 11:
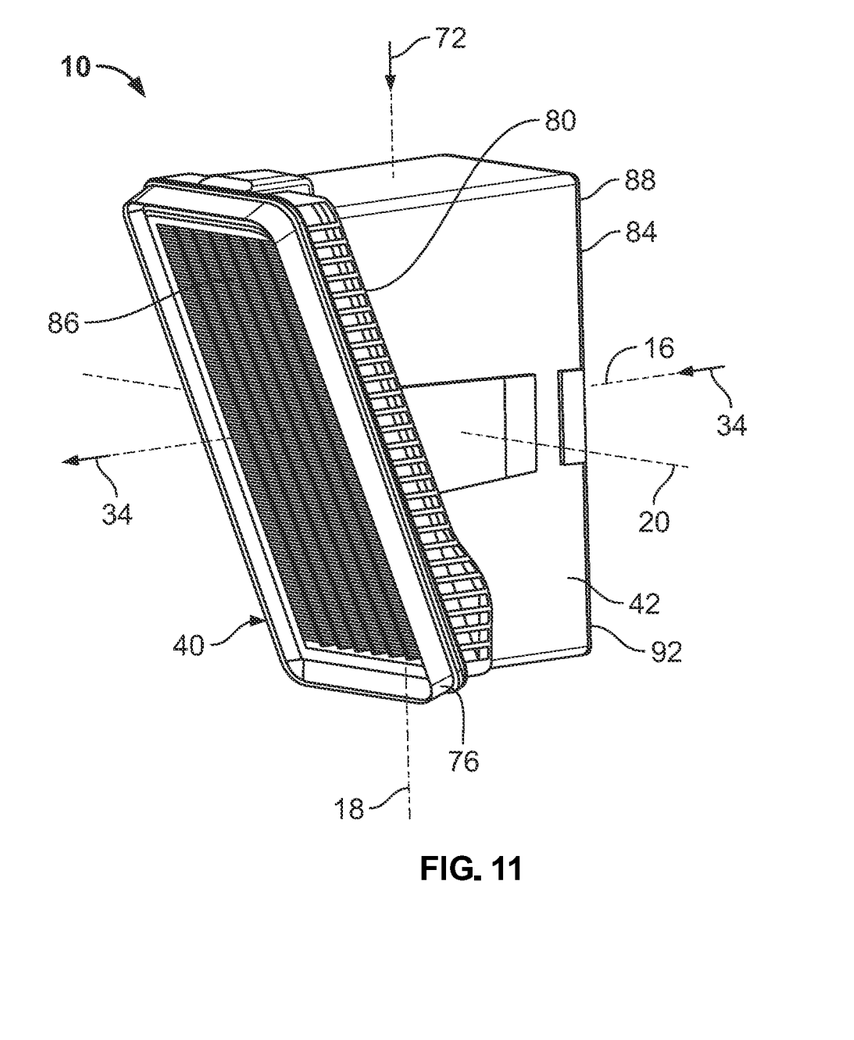
FIG. 11 is another perspective view of the filter assembly of the present teachings further illustrating an outflow side of the filter assembly.
Figure 12:
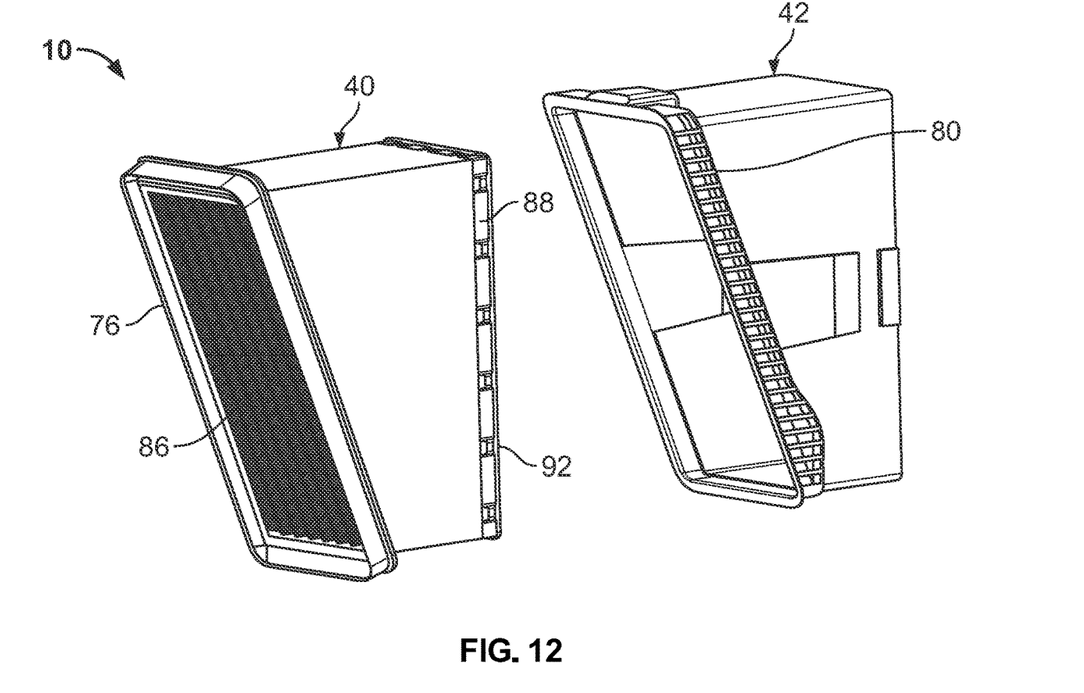
FIG. 12 is an exploded perspective view of the filter assembly of the present teachings.
Figure 13:
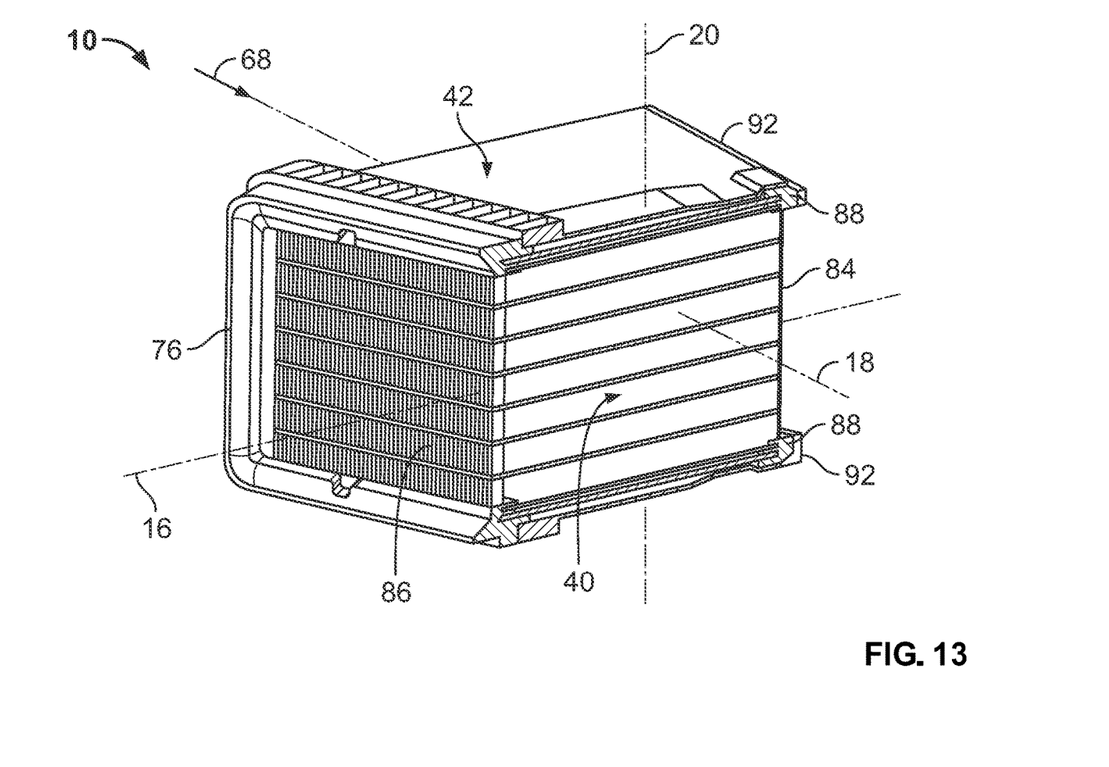
FIG. 13 is a cross-sectional view further illustrating the filter assembly of the filter assembly of the present teachings.

With continued reference to the figures, the filter assembly 10 of the present teachings will be described in further detail. As noted above, the filter assembly 10 generally includes the filter element 40 and the element frame 42. The element frame 42 is configured to provide support to the outlet seal and to transfer pressing forces from the housing body 26 and/or the housing cover 28 to the outlet seal 76 to press and seal the outlet seal 76 against an interior of the housing body 26. The filter element 40 and the element frame 42 may be manufactured as a unitary piece, as seen in FIG. 12, or as distinct components, as shown in FIGS. 10 and 11. The element frame 42 may be manufactured of plastic or another suitable material and may provide a partial or full protective cover over lateral sides of the filter medium 82 of the filter element 40.

Further, the filter element 40 of the filter assembly 10 has an inflow side 84 and an outflow side 86, which are longitudinally opposite along the main filter axis 16. The outflow side 86 is slanted in respect to both the vertical filter axis 18 and the main filter axis 16. The filter medium 82 includes fold heights that span the length between the outflow side 86 and the inflow side 84. When moving in the installation direction 72, the fold heights start at their largest height and decrease in height as the slanted outflow side 86 gradually shortens the height of the folds. Thus, the filter medium 82 has variable fold heights. In alternative embodiments within the scope of the present teachings the fold heights may be constant.

In more detail, the filter medium 82 may be constructed as a zigzag-shaped folded medium. When viewed along the main filter axis 16 the filter medium 82 has a rectangular cross section but may have a different cross-sectional shape in alternative embodiments within the scope of the present teachings. The cross section may be circular or ovular, for examples. When viewed along the horizontal filter axis 20, the filter medium 82 has an approximate shape of a right-angle trapezoid.

With additional respect to the filter element 40, the outflow side 86 is circumferentially bordered by the outlet seal 76. The outlet seal 76 may be made of polyurethane or a similarly elastic material. The outlet seal 76 may be foamed onto the end of the face of the filter medium 82. The outlet seal 76 projects farther downstream in the airflow direction 34 along the main filter axis 16 than the filter medium 82. Additionally, the outlet seal projects farther than the filter medium 82 in a radially outward direction from the main filter axis 16.

The inflow side 84 of the filter element 40 is circumferentially bordered by the inlet sealing member 88 which extends farther in the inflow direction along the main filter axis 16 than the element frame 42 or the filter medium 82. The inlet sealing member 88 generally includes an edge protecting portion 90 and a sealing portion 92. The edge protecting portion 90 includes a side portion 94 which extends upstream along the main filter axis 16 from the peripheral edge 96 of the inflow side 84 along a portion of the side of the filter element 40. The edge protecting portion 90 may also include an inward end portion 98 inwardly extending from the peripheral edge of the inflow side to cover a portion of the inflow side 84 of filter element 40. The sealing portion 92 depends from the edge protecting portion 90 and extends axially farther than the side portion 94 of the edge protecting portion 90 in a direction perpendicular to the main filter axis 16. The sealing portion 92 is adapted to engage with the forward housing-associated sealing surface 58 of the filter housing 14, which will be further detailed below.

The inlet sealing member 88 may be made of polyurethane (PUR) or another suitable material such that the sealing portion 92 may be resiliently deflected relative to the edge protection portion 90 by the filter housing 14 to form a seal. Preferably, the inlet sealing member 88 is made of an elastomer. Further, the sealing member 88 may be generally molded onto the filter element 40. In more detail, the inlet sealing member 88 may be foamed directly from the peripheral edge 96 of the inflow side 84 or directly from the edge of the filter medium 82. The edge protecting portion 90 and sealing portion 92 may be made as a unitary element or separate elements.

As particularly shown in FIG. 14, the sealing portion 92 may be realized as a curved lip. As illustrated, the sealing portion 92 defines a contact region 100 in a plane parallel to the inflow side 84 of the filter element 40. Further, the sealing portion 92 with the forward housing-associated sealing surface 58 creates a contact seal at the contact region 100, which prevents uncleaned air from entering the element receptacle 30 without traversing through the filter assembly 10 and thus the filter medium 82.

As illustrated in FIG. 15, the surface area of the contact region 100 becomes larger upon compression of the sealing portion 92 towards the inflow side 84 against the forward housing-associated sealing surface 58. A component of this compression may come from a combination in part of the pressing devices 60, the pressing surface 62, and the pressure blades 74 of the housing cover 28 such that when the air filter 12 is in an assembled configuration, as illustrated in FIG. 3, the sealing portion 92 is placed in a state of compression against the forward housing-associated sealing surface 58 and forms a seal. The sealing portion 92 is depicted in an undeformed, relaxed state in FIG. 15, but may be deflected by the forward housing-associated sealing surface 58 into a deformed state.

Figure 16:
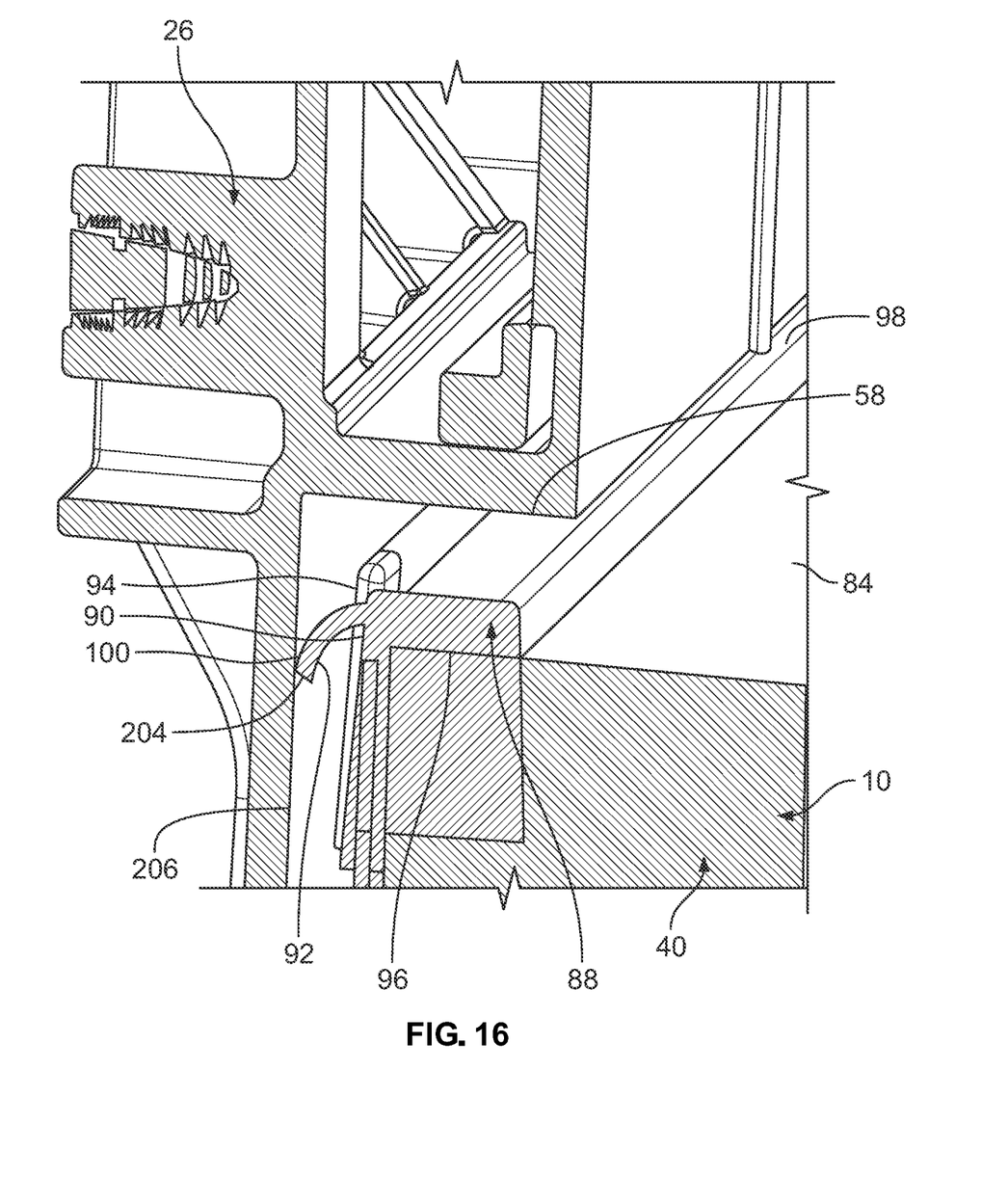
FIG. 16 is a cross-sectional view similar to FIG. 14, illustrating another filter assembly in accordance with the present teachings, the filter assembly including an inlet sealing member shown sealing onto a lateral inner wall of the housing.

Turning to the cross-sectional view of FIG. 16, another filter assembly in accordance with the present teachings is illustrated and generally identified at reference numeral 200. Given the similarities between the filter assembly 10 and the filter assembly 200, like reference characters have been used to identify like elements. The filter assembly 200 primarily differs from the filter assembly 10 in that the sealing portion 92 projects radially outward from the outer side of the edge protecting portion 90 and engages with a lateral inner wall 206 to form a seal. The sealing portion 92 is realized as a curved lip where the end 204 of the curved lip may be substantially near parallel to the main filter axis 16. The sealing portion 92 is depicted in an undeformed, relaxed state but may be deflected by the lateral inner wall 206 into a deformed state. When the sealing portion 92 is sealed upon the inner wall 206, uncleaned air is prevented from circumventing the filter assembly 10 without traversing through the filter assembly 10 and thus the filter medium 82. Additionally, a contact seal extending completely around the perimeter of the inflow side 84 may be made between the sealing portion 92 and the forward housing-associated sealing surface 58.

With general reference to the figures, it will be noted that that the sealing portion 92 of the filter assembly 200 and filter assembly 10 may take other forms than a curved lip within the scope of the present teachings. For example, the sealing portion 92 may have a right-angle prism or wedge-shaped cross section in order to facilitate connection between the sealing portion 92 and the forward housing-associated sealing surface 58 or the lateral inner wall 206. In yet another embodiment, the sealing portion 92 may generally define a protrusion axis aligned along a length of the sealing portion and extend outward from the main filter axis 16 such that an acute angle is formed between the protrusion axis and the main filter axis 16 for at least a portion of the length of the protrusion axis.

When constructing the air filter 12 and inserting the filter assembly 10 into the element receptacle 30 of the housing body 26, the rearward housing-associated sealing surface 56 and forward housing-associated sealing surface 58 are engaged against the outlet seal 76 and inlet sealing member 88, respectively. Further during installation of the air filter 12, the housing cover 28 is closed over top of the inserted filter assembly 10. As illustrated in FIG. 9, the housing cover 28 pivots about the bolt section 64 towards the element receptacle 30 and the installed filter assembly 10. Correspondingly, as the housing cover 28 incrementally pivots, the pressing blades 74 of the housing cover 28 are incrementally further disposed in the element receptacle 30. Therefore, the pressing blades 74 increase contact with the cover-blade facing pressing surface 80 of the element frame 42 which in turn increases the compression force upon the filter assembly 10. This compressive force is transmitted to the outlet seal 76 and inlet sealing member 88 to form two pressure seals between the outflow side 86 and inflow side 84 on the filter assembly 10 with the respective rearward housing-associated sealing surface 56 and forward housing-associated sealing surface 58 of the housing body 26. With the filter assembly 10 installed and the housing cover 28 articulated to a closed position, fastening the clamping fasteners 68 closed enables a nearly constant state of compression for the filter assembly 10. This state of compression correspondingly ensures nearly constant sealing between the filter assembly 10 and the housing body 26. Therefore, unclean air is prevented from circumventing the filter assembly 10.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A filter assembly for an air filter, the filter assembly comprising:
    a filter element having a filter medium, the filter element including an inflow side, an outflow side, and a filter axis extending therethrough from the inflow side to the outflow side;
    a sealing member arranged on and surrounding a peripheral edge of the inflow side of the filter element, the sealing member including an edge protecting portion and a sealing portion, the edge protecting portion including a side portion extending in a first direction from the peripheral edge of the inflow side along a portion of a side of the filter element, the sealing portion depending from the edge protecting portion and extending axially farther than the side portion of the edge protecting portion in a second direction perpendicular to the first direction;
    wherein the sealing portion is adapted to seal with and engage against a housing wall of a filter housing configured to receive the filter element;
    an outlet seal arranged on and circumferentially surrounding the outflow side of the filter element, the outlet seal arranged on an axially opposite side of the filter element relative to the sealing member, the outlet seal adapted to seal against a sealing surface of the filter housing configured to receive the filter element.

2. The filter assembly according to claim 1, wherein the edge protecting portion of the sealing member further includes an end portion inwardly extending from the peripheral edge of the inflow side to cover a portion of the inflow side.

3. The filter assembly according to claim 2, wherein the sealing portion directly depends from the end portion of the edge protection portion.

4. The filter assembly according to claim 1, wherein the sealing member is unitarily constructed to include the edge protection portion and the sealing portion.

5. The filter assembly according to claim 1, wherein the sealing member is unitarily constructed of polyurethane.

6. The filter assembly according to claim 1, wherein the sealing portion is deflectable relative to the edge protection portion.

7. The filter assembly according to claim 1, wherein the filter member is placed in an element frame and the sealing member extends farther in the inflow direction than the element frame.

8. The filter assembly according to claim 7, wherein the inflow side of the filter element is rectangular.

9. The filter assembly according to claim 1, wherein the sealing member is molded onto the filter element.

10. The filter assembly according to claim 1, wherein the sealing portion defines a contact region in a plane parallel to the inflow side of the filter element.

11. The filter assembly according to claim 10, wherein a surface area of the contact region becomes larger upon compression of the sealing portion towards the inflow side.

12. The filter assembly according to claim 1, wherein the sealing portion defines a protrusion axis aligned along a length of the sealing portion and extending outward, wherein an acute angle is formed between the protrusion axis and the filter axis for at least a portion of the length of the protrusion axis.

13. The filter assembly according to claim 1, wherein the sealing portion is formed in a shape of an outward curved lip with an end of the outward curved lip substantially near perpendicular to the filter axis.

14. The filter assembly according to claim 1, in combination with the air filter, the filter assembly disposed in the filter housing of the air filter.

15. The filter assembly in combination with the air filter of claim 14, wherein the sealing portion is deflected by the filter housing and seals onto the filter housing.

16. An air filter comprising:
   a filter housing including an installation opening, at least one inlet opening for air to be cleaned, and at least one outlet opening for cleaned air;
   wherein the housing contains an element receptacle configured to receive through the installation opening;
   a housing cover configured to selectively close the installation opening;
   the filter element of the filter assembly according to claim 1 disposed in the filter housing, the filter element separating the at least one inlet opening from the at least one outlet opening;
   wherein the sealing member of the filter element, when compressed against the housing, seals against the filter housing.

17. The air filter according to claim 16, wherein the edge protecting portion of the sealing member further includes an end portion inwardly extending from the peripheral edge of the inflow side to cover a portion of the inflow side.

18. The air filter according to claim 16, wherein the sealing member is unitarily constructed to include the edge protection portion and the sealing portion.

19. The air filter according to claim 16, wherein the sealing portion is resiliently deflected relative to the edge protection portion by the housing and seals onto the housing.

20. The air filter according to claim 16, wherein the sealing member engages with a lateral inner wall of the housing and seals upon the housing.

21. A filter element for a filter assembly, comprising:
   a filter medium including an inflow side, an outflow side, and a filter axis extending therethrough from the inflow side to the outflow side; and
   a sealing member surrounding a peripheral edge of the inflow side of the filter element, the sealing member including:
   an edge protecting portion; and
   a sealing portion;
      the edge protecting portion including a side portion extending in a first direction from the peripheral edge of the inflow side along a portion of a side of the filter element, the sealing portion formed on and depending from the edge protecting portion and extending axially farther than the side portion of the edge protecting portion in a second direction perpendicular to the first direction;
   wherein the sealing portion is adapted to seal with and engage against a housing wall of a filter housing configured to receive the filter element;
   an outlet seal arranged on and circumferentially surrounding the outflow side of the filter element, the outlet seal arranged on an axially opposite side of the filter element relative to the sealing member, the outlet seal adapted to seal against a sealing surface in the filter housing configured to receive the filter element.

22. The filter element according to claim 21, wherein the sealing member is unitarily constructed in one piece with the edge protection portion and the sealing portion.

23. The filter element according to claim 21, wherein the sealing member is unitarily constructed of polyurethane.

24. The filter element according to claim 21, wherein the sealing member is elastically deflectable relative to the edge protection portion.

25. The filter element according to claim 21, wherein the sealing member is molded onto the filter element.

* * * * *